United States Patent [19]
Lavish

[11] 3,907,054
[45] Sept. 23, 1975

[54] DIAGONAL BRACE BEARING FOR CRAWLER-TYPE TRACTORS

[75] Inventor: Ronald E. Lavish, Bartonville, Ill.

[73] Assignee: Caterpillar Tractor Company, Peoria, Ill.

[22] Filed: June 13, 1974

[21] Appl. No.: 479,098

[52] U.S. Cl.................................. 180/9.6; 305/60
[51] Int. Cl.²...................................... B62D 55/00
[58] Field of Search............... 180/9.6, 9.62, 6.2; 305/60; 308/121, 120 B

[56] References Cited
UNITED STATES PATENTS

| | | | |
|---|---|---|---|
| 2,049,643 | 8/1936 | Eberhard | 180/9.6 |
| 2,135,619 | 11/1938 | Johnston | 180/9.6 |
| 2,265,986 | 12/1941 | Allin | 180/9.6 |
| 3,186,778 | 6/1965 | Torii | 308/121 |
| 3,674,105 | 7/1972 | Egli | 180/9.62 |
| 3,800,901 | 4/1974 | Blomstrom | 180/9.62 |

*Primary Examiner*—Philip Goodman
*Assistant Examiner*—John A. Carroll
*Attorney, Agent, or Firm*—Ralph E. Walters

[57] ABSTRACT

A diagonal brace bearing for a crawler-type tractor including a sealed and lubricated one-piece cylindrical bearing and one-piece annular seals on a removable stub shaft. The diagonal brace bearing journals the stub shaft and is secured by a semi-cylindrical bearing cap to a diagonal brace rigidly connected to the track roller frame of a crawler tractor for supporting an endless track chain.

The stub shaft has one end press fitted into a coaxial bore in the innermost end of a shortened main sprocket shaft while the other end extends through a support bracket located inwardly of the diagonal brace bearing. The stub shaft along with the main sprocket shaft form an integral shaft for supporting and maintaining the proper alignment of the track roller frame during extreme lateral stresses and the construction simplifies servicing thereof.

3 Claims, 2 Drawing Figures

US Patent   Sept. 23,1975   3,907,054

3,907,054

DIAGONAL BRACE BEARING FOR CRAWLER-TYPE TRACTORS

BACKGROUND OF THE INVENTION

This invention relates to a sealed diagonal brace bearing in a crawler-type tractor which must operate effectively and durably under severe conditions.

Pertinent prior art includes U.S. Pat. Nos. 2,049,672; 2,588,328; and 2,683,634.

The earth-moving industry has long been interested in developing equipment capable of operating over any type of terrain. Rugged terrain often places extreme lateral loads on the track roller frames of such equipment, which causes improper alignment of the track roller frames. In order to maintain proper alignment of the track roller frames during these conditions, each frame is conventionally equipped with a diagonal brace extending inwardly and rearwardly to be secured to the rear drive shaft or to a pin by a bearing coaxial with the rear drive shaft of the tractor. Under normal operating conditions, conventional split bearings and seals in use by the industry permit abrasive materials to penetrate and prematurely wear out the diagonal brace bearing. Under more severe operating conditions, the diagonal brace bearings wear out even faster and result in the time-consuming and expensive procedure of replacement.

Moreover, other tractor parts in the transmission housing often obstruct the accessability to the diagonal brace bearing which means a complete disassembly of the tractor's drive components to change the diagonal brace bearing. Thus, the earth-moving industry has faced a two-fold problem: (1) the use of split bearings and seals which allow lubricant to leak out and foreign matter to get in, often resulting in the premature destruction of the diagonal brace bearing, and (2) the close proximity of tractor parts to each other on the transmission housing which obstruct the removal of the diagonal brace bearing, increasing the cost of bearing changes.

An early attempt to solve the servicing problem is illustrated by Starr, U.S. Pat. No. 2,049,672. In order to eliminate the need for removal of the entire rear axle of Starr's tractor along with its drive components, Starr employs a two-piece bearing with two-piece seals which journal the shaft in the diagonal braces.

More recently, Schick and Herr, in U.S. Pat. Nos. 2,588,828 and 2,683,634, respectively, have proposed other arrangements not requiring the removal of the rear axle. Nonetheless, these configurations still require the use of two-piece bearings with two-piece seals.

As is well-known, two-piece bearings with two-piece seals do not have the long-life characteristics of one-piece bearings and seals. As a result, while servicing problems are rendered less difficult by these proposals, servicing is still required on a more frequent basis than would be the case if a one-piece cylindrical bearing with one-piece seals could be employed to minimize the penetration of abrasive materials and to reduce the frequency of replacement.

SUMMARY OF THE INVENTION

It is the principal object of the invention to provide a new and improved sealed diagonal brace bearing for a long-lasting performance under extreme loads which a crawler tractor experiences under various operating conditions. More specifically, it is an object of the invention to provide a sealed diagonal brace bearing which prevents the penetration of abrasive material and withstands the enormous lateral stresses of a crawler tractor operating over rugged terrain and yet which may be easily serviced independently of the other components of the crawler tractor.

An exemplary embodiment of the invention achieves the foregoing objects in a construction including a roller track frame supporting an continuous track chain with the main drive sprocket rotatably mounted on a main sprocket shaft. The roller track frame is maintained in proper alignment by a diagonal brace which is rigidly secured to the roller track frame at one end. At its other end, it is rotatably secured to a stationary stub shaft by means of an improved sealed diagonal bearing and bearing cap. The improved sealed diagonal bearing is a single-piece cylindrical bearing with one-piece annular seals which provides maximum protection from grit and ensures maximum lubrication of the assembly.

The stub shaft is telescopically received in one end of a main sprocket shaft whereby the two shafts form a single integral shaft for supporting and aligning the track roller frame. Preferably the stub shaft is press fit into a bore on the innermost end of the main sprocket shaft.

In a highly preferred embodiment, the stub shaft has a length sufficient to extend through the improved sealed diagonal brace bearing to a support bracket which is located inwardly of the diagonal brace for securing the other end of the stub shaft remote from the main sprocket shaft. The support bracket stationarily receives the stub shaft which is secured to the support bracket by a semi-cylindrical cap similar to the diagonal brace bearing cap. Also, in a highly preferred embodiment, a bore is provided in the stub shaft for receiving a puller tool whereby service tools can easily remove the stub shaft from its press fit within the main sprocket shaft.

Other objects and advantages will become apparent from the following specification taken in connection with the accompanying drawings.

DESCRIPTION OF THE PREFERRED EMBODIMENT

Figure 1:
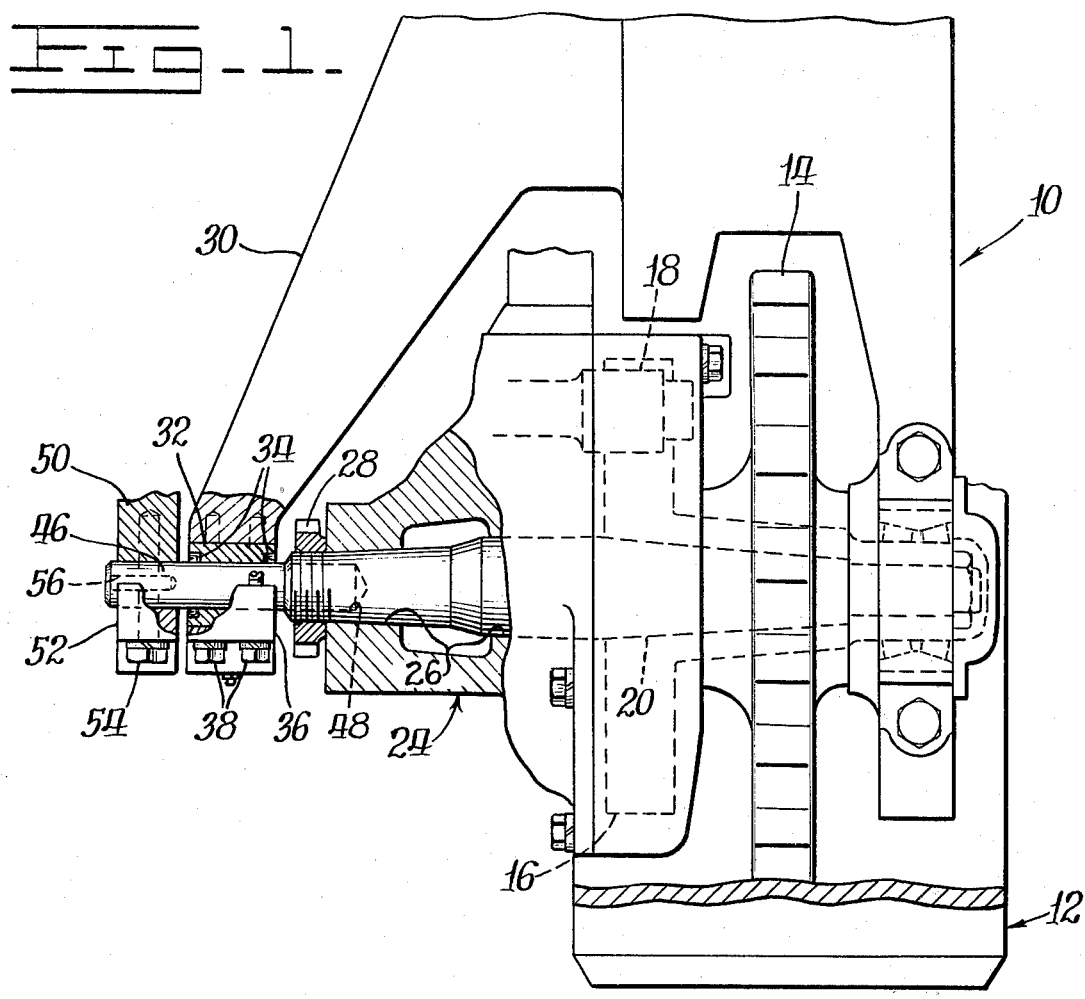
FIG. 1 is a plan view of a diagonal brace and bearing support made according to the invention with parts shown in section.

One embodiment of a track roller frame on a crawler-type tractor for operation in rugged terrain made according to the invention is illustrated in FIG. 1 and is seen to include a track roller frame, generally designated 10, mounting an endless track chain, generally designated 12, which is driven by a drive sprocket 14. Each drive sprocket 14 is rotated by a concentrically mounted gear 16 and a drive pinion 18 which is conventionally driven by means not shown. The gear 16 is journaled on a main sprocket shaft 20 and suitable bearings are provided thereat. The gear 16, drive pinion 18, and main sprocket shaft 20 are all housed within a drive casing, generally designated 24. In this respect the main sprocket shaft 20 is press fitted into mating bores 26 within the drive casing 24 and secured thereto by a nut 28 on the inward end of the main sprocket shaft 20.

Figure 2:
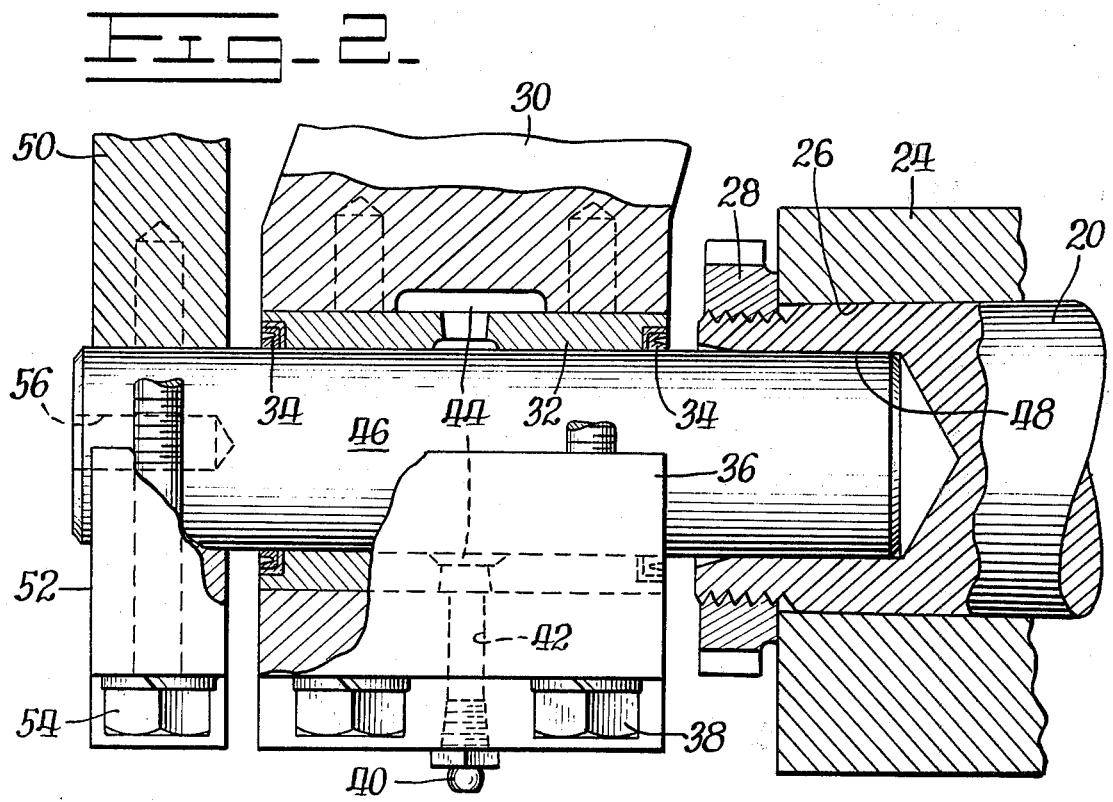
FIG. 2 is an enlarged view of the stub shaft assembly and the one-piece seals and bearing for the diagonal brace.

A diagonal brace 30 may take on any desired shape or size; its shape and size will be dependent upon the contemplated lateral loads placed on the track roller frame 10 during its operation. In the embodiment illustrated in FIG. 1, the diagonal brace 30 is rigidly connected to the track roller frame and extends inwardly and rearwardly to a one-piece cylindrical bearing 32 with two one-piece annular seals 34 at each end thereof, as also seen in FIG. 2. The diagonal brace bearing 32 is removably secured to the end of the diagonal brace 30 by a cylindrical bearing cap 36 and bolts 38.

Preferably, the one-piece cylindrical bearing 32 as seen in FIG. 2 has a grease fitting 40 with lubricant passages 42 and lubricant chambers 44 for lubricating the one-piece diagonal brace bearing 32. Also, the one piece annular seals 34 as shown in FIG. 2 at each end of the cylindrical bearing 32 prevent abrasive grit from entering and lubrication from leaking out of either end of the diagonal brace bearing 32.

One end of a stub shaft 46 is telescopically received within an internal bore 48 at the innermost end of the main sprocket shaft 20. The remaining length of the stub shaft 46 passes through the one-piece cylindrical bearing and seals of the diagonal brace construction and is stationarily connected to a support bracket 50 (usually integral with tractor transmission housing) by a semi-cylindrical cap 52, similar to bearing cap 36, for anchoring the other end of the stub shaft 46 to the tractor body.

Turning now to the support bracket 50, as best seen in both FIGS. 1 and 2, a semi-cylindrical cap 52 anchors the stub shaft 46 to the tractor body by bolts 54 (only one of which is shown). Moreover, the stub shaft 46, the bearing cap 36, the support bracket cap 52 and the fastening bolts 38 and 54 are all seen to be unobstructed by their adjacent tractor parts for easy removal and servicing.

FIG. 2 clearly shows the stub shaft 46 in its relation to the main sprocket shaft 20, the diagonal brace 30 and the support bracket 50. The stub shaft 46 is shown here to be coaxially received within an internal bore 48 of the main sprocket shaft 20 by a press fit.

Finally, means for attaching a puller tool to the stub shaft 46 is provided by a threaded bore 56 at the support bracket end of the stub shaft. A puller tool is attached to the bore 56 and the stub shaft 46 is pulled out of its press fit in the main sprocket shaft 20 after diagonal brace bearing cap 36 and the support bracket cap 52 are removed.

From the previous discussion, it will be appreciated that a sealed diagonal brace bearing made according to the invention allows a crawler tractor to operate longer under the most severe conditions by enabling the use of single-piece seals and bearings. The diagonal brace connection to the stub shaft is not only unobstructed by other tractor parts but the compactness of the new diagonal brace connection permits its use even on a small size tractor which previously could not be adapted to use the full circular diagonal brace bearing and one-piece seals. Through the use of a stub shaft to effect the diagonal brace connection, the main sprocket shaft is shortened, which eliminates the necessity for a long single shaft, thereby providing substantial savings.

It will be further appreciated that the stub shaft which is press fit into the shortened main sprocket shaft adapts itself to quick removal and uncomplicated bearing changes even in the field to provide a minimum of tractor down time.

I claim:

1. In a tractor having a body and a roller frame for supporting a continuous track chain, a drive sprocket for rotating said track chain and means for mounting said drive sprocket on said roller frame, said drive sprocket rotatably mounting a main sprocket shaft, a drive casing for housing said main sprocket shaft, a stub shaft coaxial with said main sprocket shaft, a diagonal brace secured to said roller frame and to said stub shaft, a bearing, a bearing cap, said diagonal brace extending inwardly and rearwardly in relation to said tractor body and cooperating with said bearing cap to removably mount said bearing in a journaling relation to said stub shaft, the improvement comprising: means releasably connecting said stub shaft directly to one end of said main sprocket shaft, said connecting means forming a single sprocket shaft out of said main sprocket shaft and said stub shaft for a supportive connection to said diagonal brace, said bearing comprising a single-piece cylindrical sleeve with complementing single-piece annular seals on opposite ends thereof and being secured by said bearing cap to said diagonal brace, said single-piece cylindrical bearing being rotatably received on said stub shaft.

2. A tractor according to claim 1 wherein said connecting means includes an internal bore on the innermost end of said main sprocket shaft for telescopically receiving said stub shaft and means on said innermost end for securing said main sprocket shaft against axial movement relative to said drive casing.

3. A tractor comprising the combination of claim 2 and further including a support bracket on said tractor located inwardly of said diagonal brace, said stub shaft having a length sufficient to extend through said single-piece cylindrical bearing and one-piece seals to said support bracket, the end of said stub shaft remote from said main sprocket shaft being stationarily received in said support bracket and being provided with means for attaching a puller tool whereby said stub shaft is readily removable from said main sprocket shaft.

* * * * *

UNITED STATES PATENT OFFICE
CERTIFICATE OF CORRECTION

PATENT NO. : 3,907,054
DATED : September 23, 1975
INVENTOR(S) : Ronald E. Lavish It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-third Day of December 1975

[SEAL]

Attest:

RUTH C. MASON
*Attesting Officer*

C. MARSHALL DANN
*Commissioner of Patents and Trademarks*